(12) United States Patent
McCormick et al.

(10) Patent No.: US 8,257,003 B2
(45) Date of Patent: Sep. 4, 2012

(54) SIDE ACTUATED COLLET LOCK MECHANISM

(75) Inventors: Michael R. McCormick, Greensburg, PA (US); Filho Ruy Frota de Souza, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 942 days.

(21) Appl. No.: 12/235,992

(22) Filed: Dec. 5, 2008

(65) Prior Publication Data

US 2010/0140882 A1 Jun. 10, 2010

(51) Int. Cl.
*B23B 31/20* (2006.01)

(52) U.S. Cl. ........... 409/234; 279/20; 279/46.4; 279/51

(58) Field of Classification Search ................. 409/234; 279/20, 43.3, 43.4, 46.4, 51; B23B 31/20
See application file for complete search history.

(56) References Cited

U.S. PATENT DOCUMENTS

| | | | | |
|---|---|---|---|---|
| 933,923 | A * | 9/1909 | Sanborn | 279/51 |
| 2,710,193 | A * | 6/1955 | Baron | 279/56 |
| 3,171,665 | A * | 3/1965 | Brauer | 279/67 |
| 3,301,581 | A * | 1/1967 | Winberg | 403/379.4 |
| 3,542,385 | A | 11/1970 | Seitter | |
| 4,575,293 | A | 3/1986 | Berti | |
| 4,715,753 | A * | 12/1987 | Tack | 409/234 |
| 4,981,057 | A | 1/1991 | von Haas et al. | |
| 5,096,212 | A * | 3/1992 | Walsh | 279/9.1 |
| 5,341,710 | A * | 8/1994 | Peuterbaugh | 409/234 |
| 5,466,102 | A * | 11/1995 | Erickson | 409/232 |
| 5,702,211 | A * | 12/1997 | Roemer et al. | 408/56 |
| 5,752,706 | A * | 5/1998 | Hodges | 279/16 |
| 5,957,467 | A | 9/1999 | Hornung | |
| 5,984,595 | A * | 11/1999 | Mizoguchi | 408/57 |
| 6,270,086 | B1 | 8/2001 | Lloyd | |
| 6,415,696 | B1 | 7/2002 | Erickson et al. | |
| 6,543,318 | B1 * | 4/2003 | Erickson | 82/1.11 |
| 6,726,412 | B2 * | 4/2004 | Sugata et al. | 408/57 |
| 6,786,119 | B1 * | 9/2004 | Erickson et al. | 82/158 |
| 6,832,433 | B2 * | 12/2004 | Kramer | 29/558 |

(Continued)

FOREIGN PATENT DOCUMENTS

DE 03938689 A1 5/1991

(Continued)

OTHER PUBLICATIONS

International Search Report and Written Opinion dated Feb. 22, 2010.

*Primary Examiner* — Eric A Gates
(74) *Attorney, Agent, or Firm* — Larry R. Meenan, Esq.

(57) ABSTRACT

A side actuated collet lock mechanism includes a collet; a drawbar at least partially disposed within the collet, and a pair of wedge members threadingly received onto each end of a double-ended drive screw. The drive screw is rotated to cause the wedge members to move downward such that a first cam surface engages the drawbar. The drawbar and collet are pulled into the tool holder and firmly secure the shank. To remove the shank, the drive screw is rotated in an opposite direction to cause the wedge members to move upward such that a second cam surface engages the drawbar. The drawbar and the collet are pushed out from the toolholder, thereby releasing the shank.

19 Claims, 10 Drawing Sheets

U.S. PATENT DOCUMENTS

| | | |
|---|---|---|
| 7,240,594 B2 | 7/2007 | Erickson et al. |
| 7,731,458 B2 * | 6/2010 | Matheis ........................ 409/234 |
| 2006/0228183 A1 * | 10/2006 | Kress et al. .................... 409/234 |
| 2009/0283975 A1 * | 11/2009 | Kretzschmann et al. ....... 279/76 |
| 2011/0169230 A1 * | 7/2011 | Babel ............................. 279/20 |

FOREIGN PATENT DOCUMENTS

| | | | |
|---|---|---|---|
| JP | 56139807 A | * | 10/1981 |
| JP | 60-104625 | | 6/1985 |
| JP | 02-243207 | | 9/1990 |
| JP | 09136204 A | * | 5/1997 |
| JP | 2006075877 A | * | 3/2006 |
| SU | 409794 A | * | 4/1974 |
| SU | 546434 A | * | 3/1977 |
| SU | 627922 A | * | 8/1978 |
| SU | 01202735 A | | 7/1986 |
| WO | 95/27581 | | 8/1995 |

\* cited by examiner

SIDE ACTUATED COLLET LOCK MECHANISM

BACKGROUND OF THE INVENTION

The invention relates to chucks and sockets and, more particularly, to a collet and lock nut assembly for use with machine tools. Most particularly, the invention relates to a collet and lock nut assembly having a side lock mechanism and a lock nut that allow easy, clip-in entry of the collet, while ensuring removal of the collet and cutting tool from the chuck.

Collets for use in tool-holding chuck assemblies are well known. Such collets generally comprise a tubular body formed from a plurality of elongated, flexible steel fingers. The fingers are separated by longitudinal collet saw slots that impart some degree of radial flexibility to the collet, which allows the collet to selectively grip the shank of a cutting tool, such as a drill bit. Adjacent gripping fingers are interconnected by an alternating pattern of metal webs to form a one-piece collet body. In operation, the collet body is inserted in a complementary-shaped opening in a chuck shaft so that a distal end of the collet body projects out of the shaft. An annular lock nut having an inner diameter screw thread that matches an outer diameter screw thread on the shaft is then installed over the shaft and distal end of the collet body. The lock nut has a nose ring with a frustoconical cam surface that engages the distal end of the collet body and squeezes it radially inwardly as the lock nut is screwed onto the chuck shaft. The radial compression that the lock nut applies to the distal end of the collet body flexes the body inwardly, creating a gripping force between the inner diameter of the collet body and a tool shank inserted therein.

Unfortunately, existing lock nuts used for tightening collets into the chuck are usually large in diameter, reducing the clearance with the workpiece thus limiting the ability of machining pockets. Also, the locknut is a natural source of unbalance, due to the manufacturing tolerances. Additionally, the locknuts have a tendency to disengage with the collet if the operator is not careful when installing the collet into the lock nut. If the collet is accidentally disengaged from the lock nut prior to assembly with the chuck, the collet will lock down properly, but the lock nut will not be able to remove the collet from the chuck. The lock nut can be unscrewed from the chuck, but the collet and cutting tool are left inside the chuck. When this occurs, the only way to remove the collet is to unthread the retention knob and drive the collet out from the rear of the tool holder by using a drift.

Thus, there is a need for an improved collet lock mechanism that is naturally balanced, while providing a solution to overcome the problems associated with the use of existing lock nuts.

BRIEF SUMMARY OF THE INVENTION

Briefly, according to this invention, there is provided a side actuated collet lock mechanism comprises a collet; a drawbar a drawbar at least partially disposed within the collet, the drawbar including a recess formed with a bottom surface, a first side wall and a second side wall and a radially-extending aperture therethrough; and a pair of wedge members threadingly received onto each end of a double-ended drive screw. The pair of wedge members and the double-ended drive screw are at least partially disposed within aperture of the drawbar. Each wedge member includes a first cam surface for selectively engaging the first side wall of the drawbar, and a second cam surface for selectively engaging the second side wall of the drawbar. Rotation of the double-ended drive screw in a first direction causes the first cam surface to engage the first side wall of the drawbar and move the drawbar in a first direction along its longitudinal axis such that the drawbar engages the inside surface of the collet and forces the collet to collapse radially inward. Rotation of the double-ended drive screw in a second direction causes the second cam surface to engage the second side wall of the drawbar and move the drawbar in a second direction along its longitudinal axis such that the drawbar no longer engages the inside surface of the collet and causes the collet to expand radially outward.

In another embodiment, a side actuated collet lock mechanism for securing a tool shank in a tool holder comprises a collet including a body with a passageway having an inside surface. The body of the collet includes a generally parallel array of slots separated by gripping fingers. A drawbar includes a body having a first portion including a plurality of locking tabs and a second portion, at least a portion of the first portion with the plurality of locking tabs being disposed within the passageway of the collet, the second portion including a recess and a radially-extending aperture therethrough. The recess is formed with a bottom surface, a first side wall and a second side wall. A pair of wedge members is threadingly received onto each end of a double-ended drive screw. The pair of wedge members and the double-ended drive screw is at least partially disposed within aperture of the drawbar. Each wedge member includes a first cam surface for selectively engaging the first side wall of the drawbar, and a second cam surface for selectively engaging the second side wall of the drawbar. Rotation of the double-ended drive screw in a first direction causes the first cam surface to engage the first side wall of the drawbar and move the drawbar in a first direction along its longitudinal axis such that the locking tabs of the drawbar engage the inside surface of the collet. Rotation of the double-ended drive screw in a second direction causes the second cam surface to engage the second side wall of the drawbar and move the drawbar in a second direction along its longitudinal axis such that the locking tabs of the drawbar no longer engage the inside surface of the collet.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
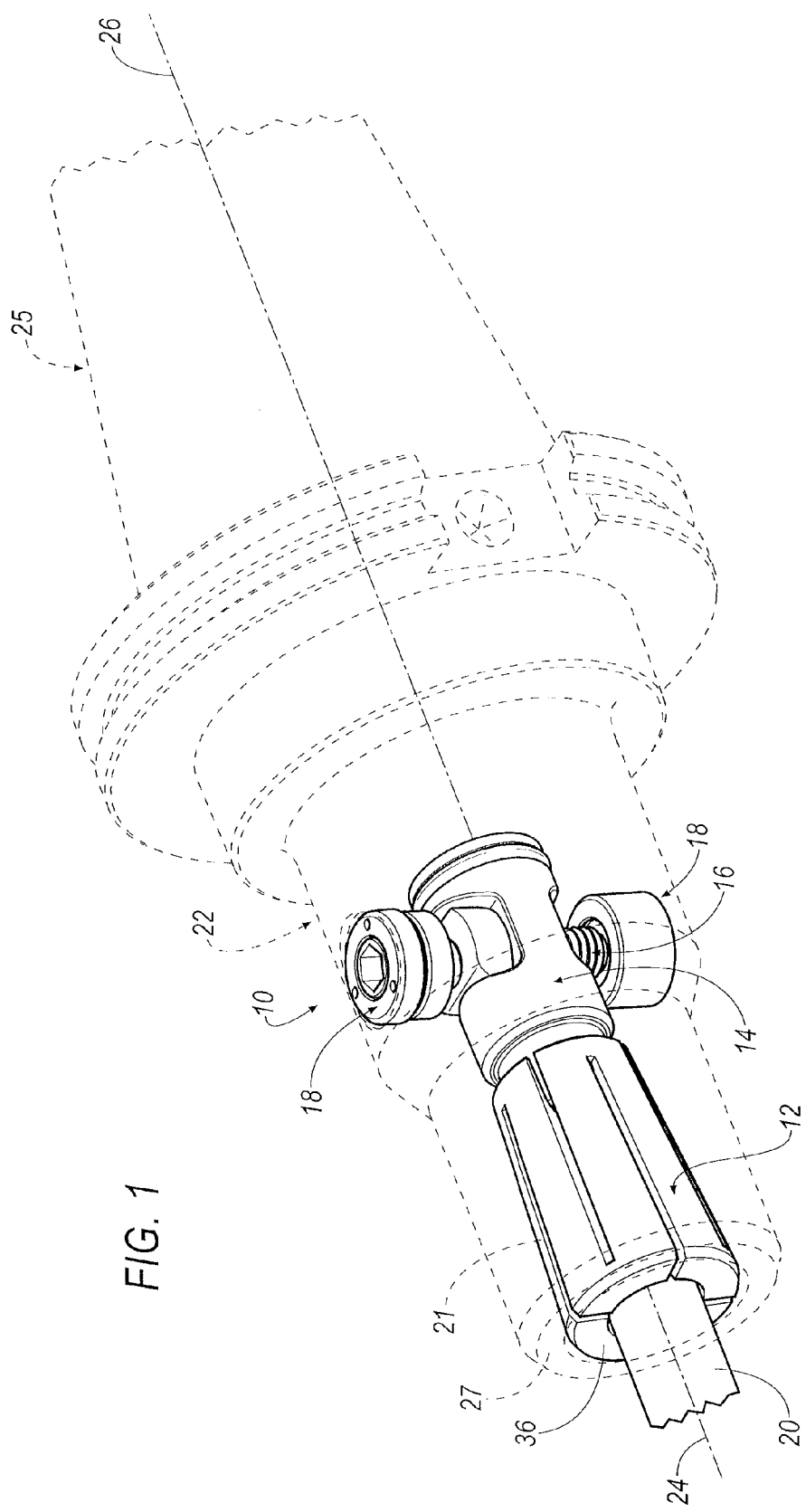
FIG. 1 is a perspective view of a side actuated collet lock mechanism when mounted in a tool holder according to an embodiment of the invention.
Figure 2:
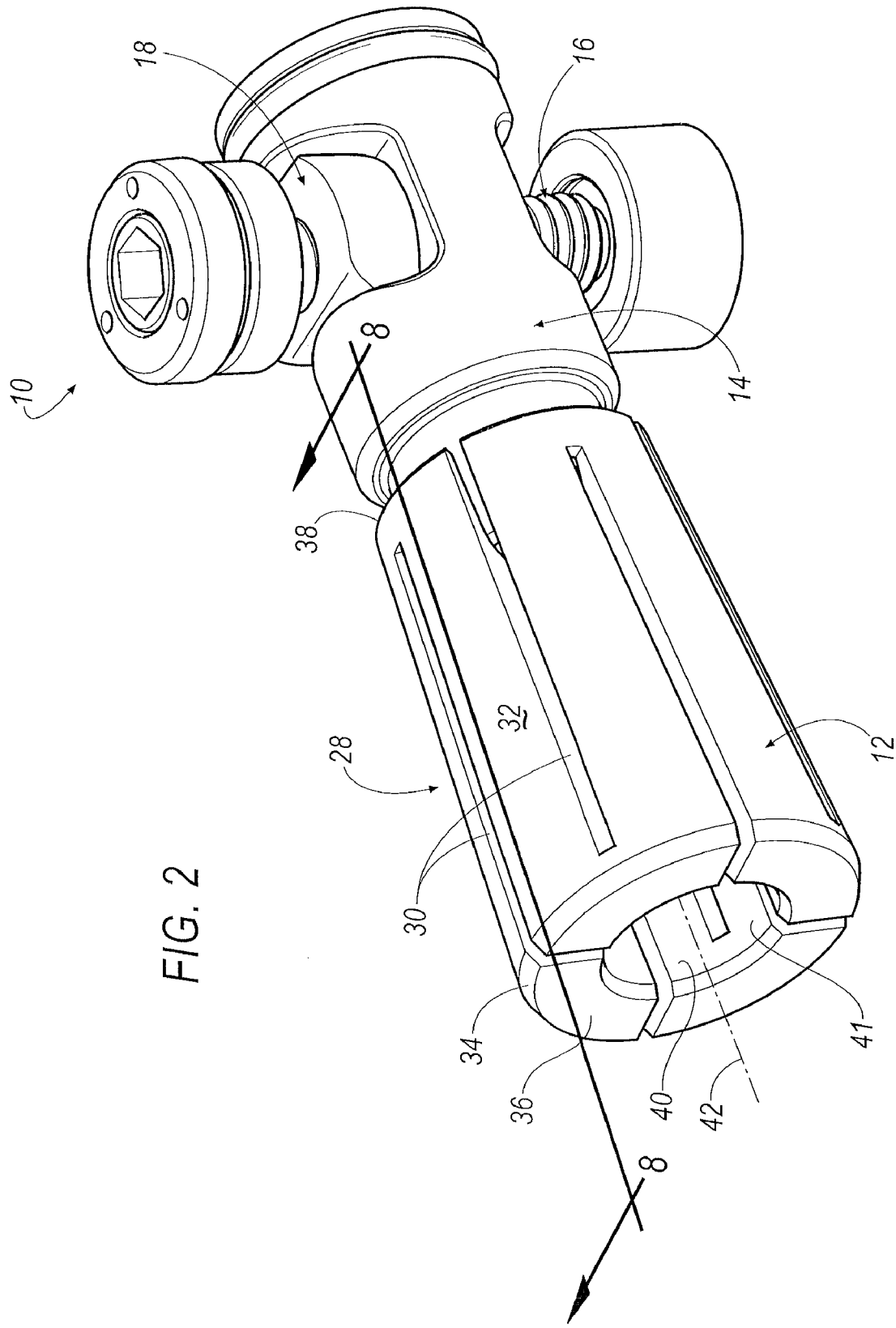
FIG. 2 is a perspective view of the side actuated collet lock mechanism of FIG. 1.

With reference now to the drawings, wherein like numerals designate like components throughout all of the several figures, there is illustrated in FIGS. 1 and 2 a side actuated collet lock mechanism, shown generally at 10, according to an embodiment of the invention. The side actuated collet lock mechanism comprises a collet 12, a drawbar 14, a double-ended drive screw 16, and a pair of wedge members 18. The collet 12 is adapted to be received within a collet bore 21 of a chuck 22 of a tool holder 25, and is capable of receiving a shank 20 of a cutting tool, which may be, for example, a drill bit, and the like (not shown). The collet bore 21 is generally frustoconical in shape and tapers inwardly from the front of the tool holder 25 toward the rear of the tool holder 25. When the shank 20 of the cutting tool is properly mounted to the chuck 22 by the side actuated collet lock mechanism 10, a centerline 24 of the shank 20 is substantially aligned with a centerline 26 of the tool holder 25.

Figure 3:
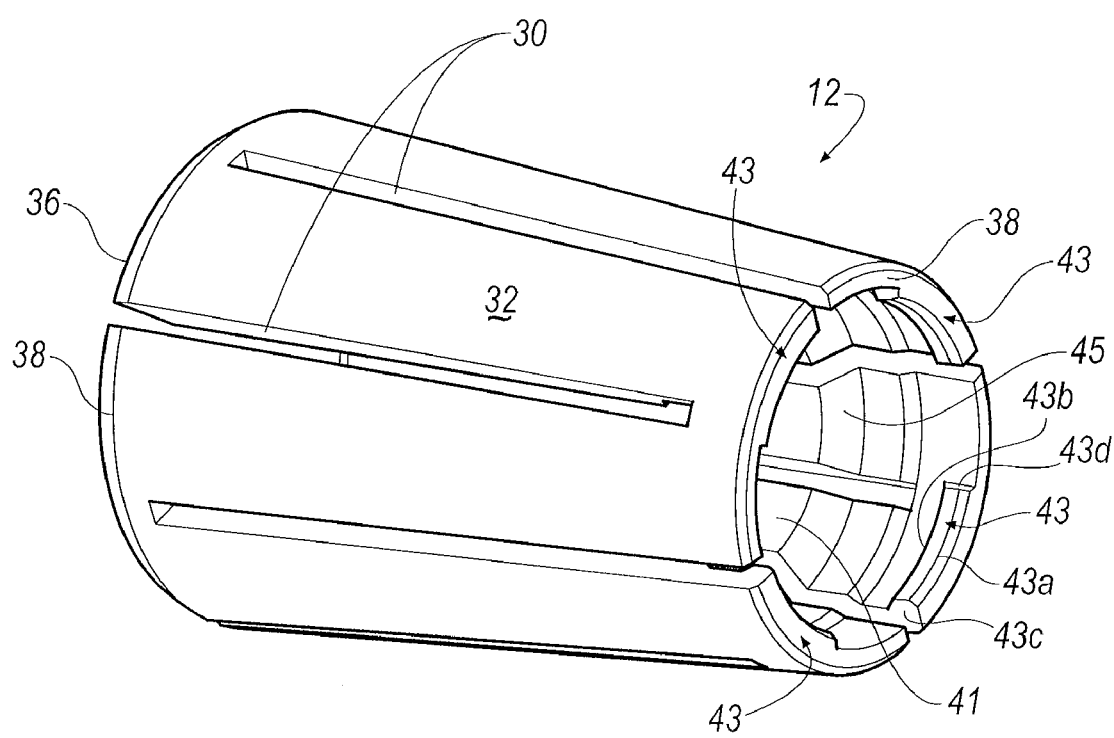
FIG. 3 is a perspective view of a collet of the side actuated collet lock mechanism according to an embodiment of the invention.

Referring now to FIGS. 2 and 3, the collet 12 is made from a resilient steel alloy and generally comprises a body 28 that includes a generally parallel array of slots 30 separated by gripping fingers 32. The slots 30 allow the collet 12 to be radially compressed to firmly grip the shank 20 of the cutting tool. An angled nose 34 is tapered inwardly to a front surface 36 of the collet 12. The body 28 of the collet 12 is generally frustoconical in shape and tapers inwardly from the front surface 36 to a back surface 38, similar to the collet bore 21 of the chuck 22. As seen in FIG. 2, the collet 12 further includes a cylindrically-shaped passageway 40 with an inside surface 41 that is concentrically provided along an axis of rotation 42 of the collet 12 for receiving the shank 20 of the cutting tool.

Figure 9:
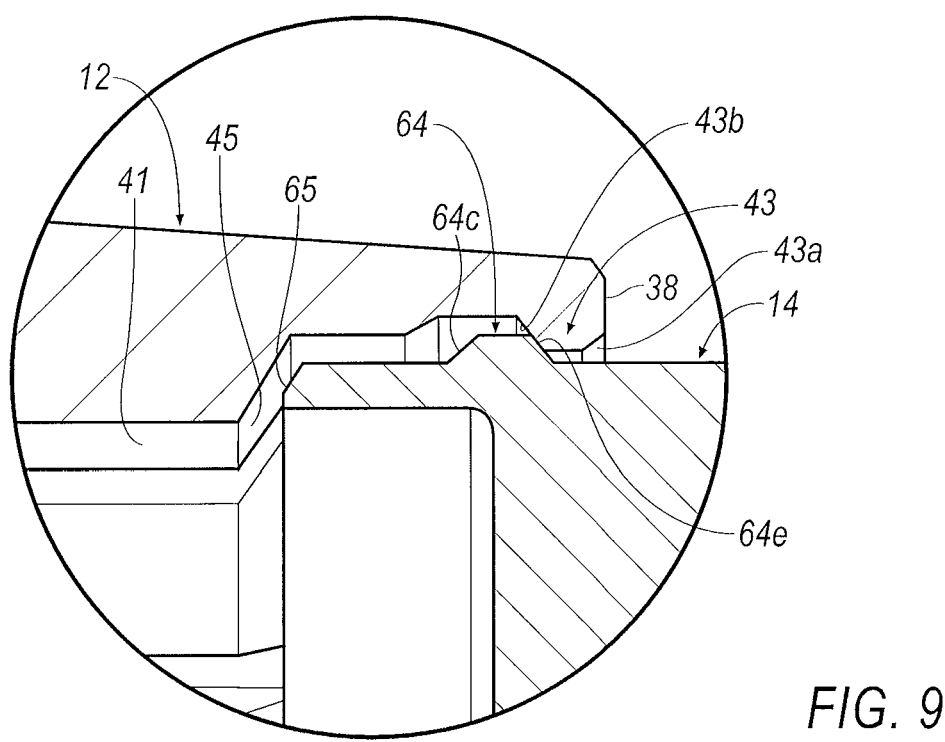
FIG. 9 is an enlarged view of the collet and drawbar shown in FIG. 8.

In an embodiment shown in FIG. 3, the inside surface 41 of the collet 12 distal the front surface 36 (proximate the back surface 38) includes a plurality of locking tabs 43. As shown in FIG. 9, each locking tab 43 include sidewalls 43a, 43b and end walls 43c, 43d. The inside surface 41 of the collet 12 also includes a forward contact surface 45. In the illustrated embodiment, the collet 12 includes a total of four (4) locking tabs 43 and the drawbar 14 includes a corresponding number of locking tabs 64. However, it will be appreciated that the invention is not limited by the number of collet locking tabs 43 and draw bar locking tabs 64, and that the invention can be practiced with two (2) or more collet locking tabs 43 and draw bar locking tabs 64. The purpose of the collet locking tabs 43 and the draw bar locking tabs 64 will be described below.

Figure 4:
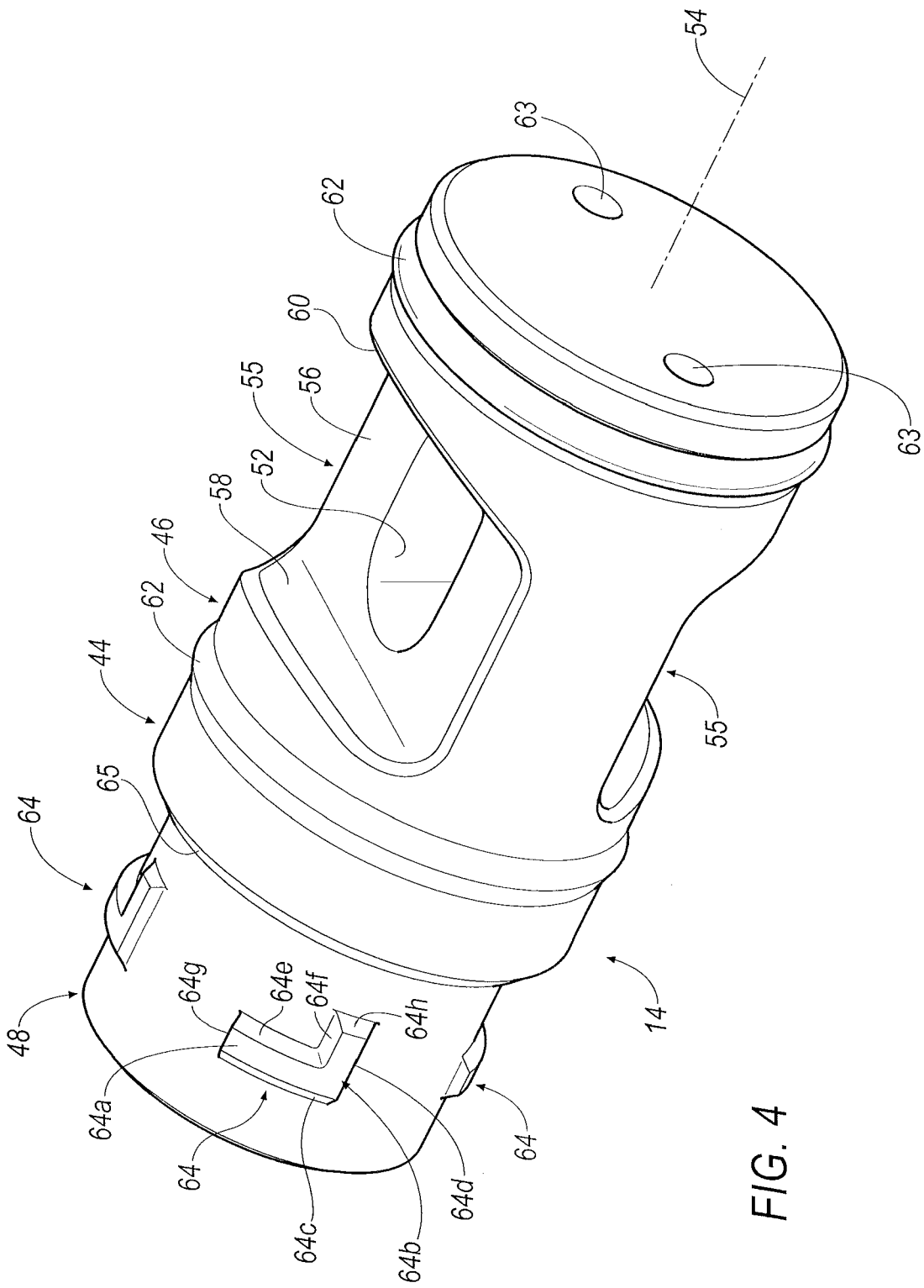
FIG. 4 is a perspective view of a drawbar of the side actuated collet lock mechanism according to an embodiment of the invention.
Figure 5:
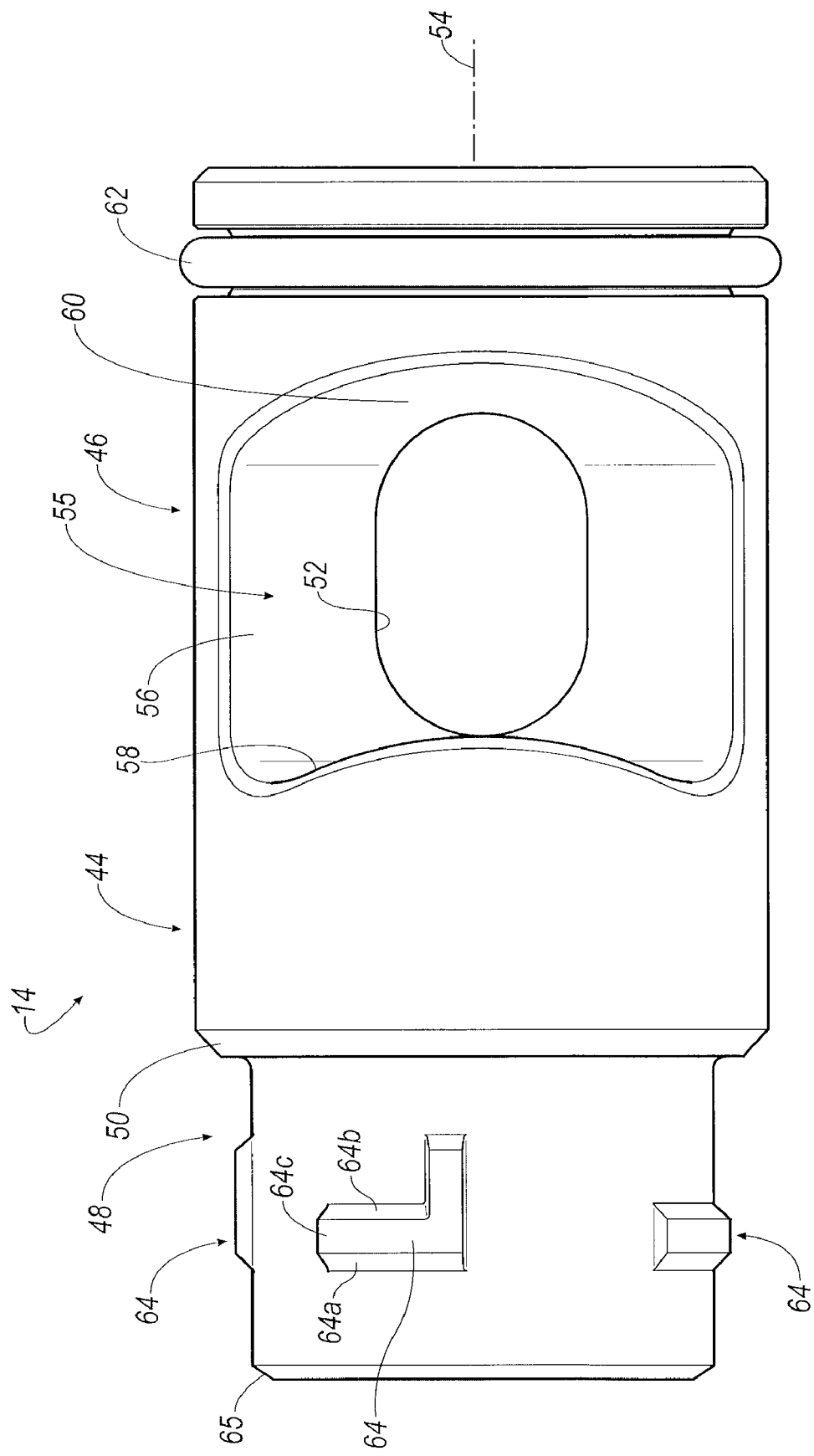
FIG. 5 is a top view of the of the drawbar of FIG. 3.

Referring now to FIGS. 4 and 5, the drawbar 14 has a generally cylindrical body 44 that has a first portion 46 with a first diameter and a second portion 48 with a relatively smaller, reduced diameter and an intermediate, transition portion 50 between the first and second portions 46, 48. A radially-extending aperture 52 that is substantially perpendicular to a longitudinal axis 54 extends through the first portion 44 of the drawbar 14. In the illustrated embodiment, the aperture 52 is substantially non-circular in cross-sectional shape to allow the drawbar to slide along the longitudinal axis 54 while the drive screw 16 is actuated. A recess 55 is formed on opposite sides of the drawbar 14 with a bottom surface 56 that provides an abutment surface for the wedge members 18, and a pair of opposing side walls 58, 60 that selectively engage the wedge members 18 to act as a cam surface. The first portion 46 also includes a sealing member 62, such as an O-ring, and the like, that provides a seal for coolant supplied by optional coolant passages 63 through the drawbar 14. Another sealing member 62 can be provided on the opposite side of the recess 55.

The second portion 48 of the drawbar 14 includes a plurality of raised locking tabs 64 circumferentially disposed about the outer, circumferential surface, and a forward contact surface 65. The raised locking tabs 64 have generally an L-shaped profile that include a circumferential first portion 64a that is generally perpendicular to the longitudinal axis 54 and a second portion 64b that is generally parallel to the longitudinal axis 54. In other words, the first portion 64a is generally perpendicular to the second portion 64b. Each raised locking tab 64 includes sidewalls 64c, 64d, 64e, 64f and a pair of end walls 64g, 64h. The number of locking tabs 64 can vary, depending on the particular application. In the illustrated embodiment, the second portion 48 includes four (4) locking tabs 64 that are disposed about ninety (90) degrees apart from each other. However, it will be appreciated that the invention is not limited by the number of locking tabs, and that the invention can be practiced with any number of locking tabs that are disposed oppositely from each other. For example, the invention can be practiced with six (6) locking tabs 43, 64 that are disposed sixty (60) degrees apart from each other. In another example, the invention can be practiced with eight (8) locking tabs 43, 64 that are disposed forty-five (45) degrees apart from each other.

As described in more detail below, the sidewall 64e of the locking tab 64 engages the sidewall 43a of the collet 12 to pull the collet 12 as the drawbar 14 moves in the direction along the longitudinal axis 54 of the drawbar 14 and cause the gripping fingers 32 of the collet 12 to collapse radially inward and securely grip the shank 20 of the tool. Oppositely, the forward contact surface 65 of the drawbar 14 engages the forward contact surface 45 of the collet 12 to push the collet 12 away from the drawbar 14 as the drawbar 14 moves in an opposite direction along the longitudinal axis 54 of the drawbar 14 and cause the gripping fingers 32 of the collet 12 to expand radially outward and release the shank 20 of the tool. It will be appreciated that the invention can be practiced with locking tabs of any desirable geometrical shape, such as round, square, and the like.

Figure 6:
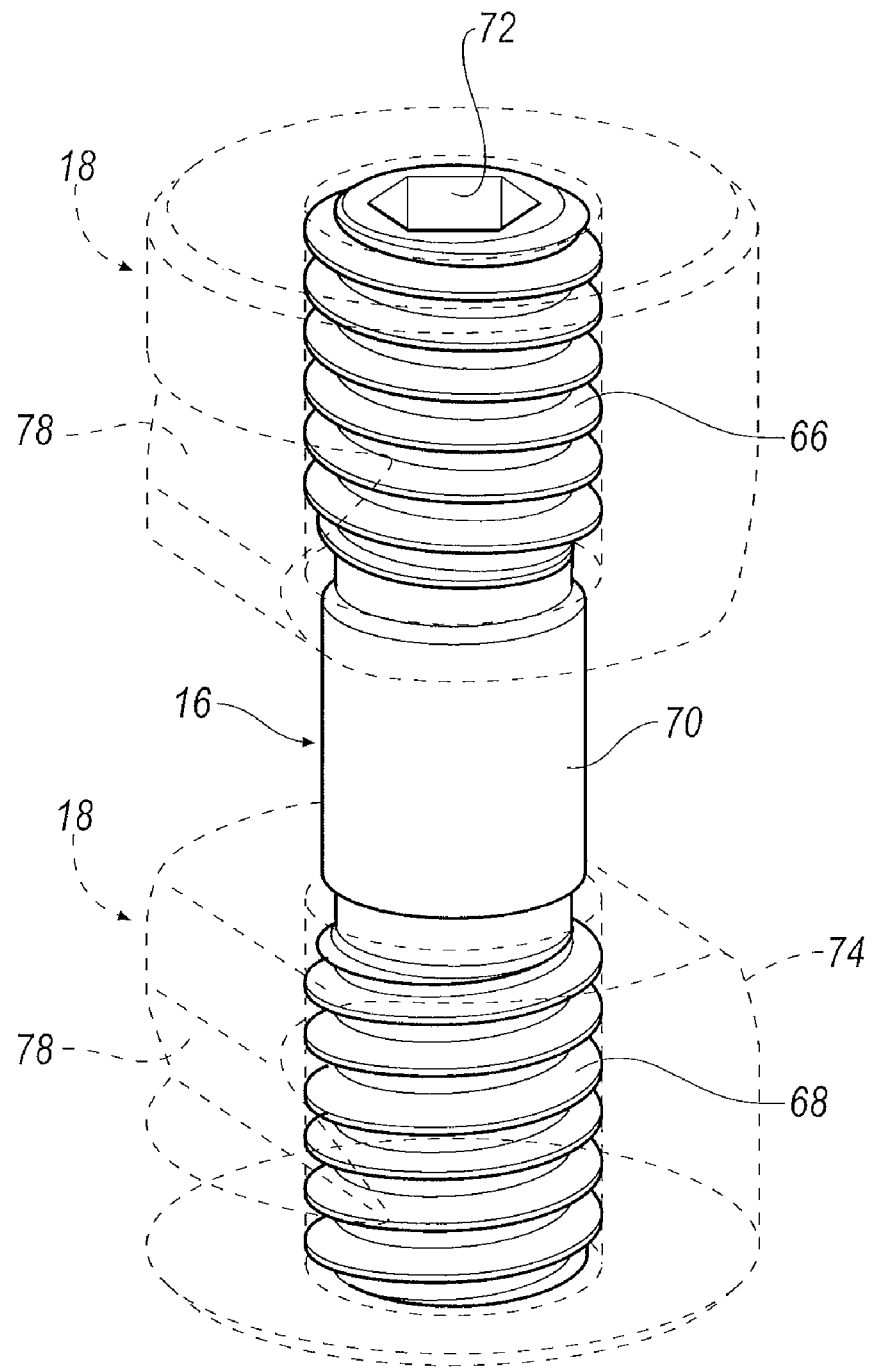
FIG. 6 is a perspective view of a double-ended drive screw and wedge members of the side actuated collet lock mechanism according to an embodiment of the invention.
Figure 7:
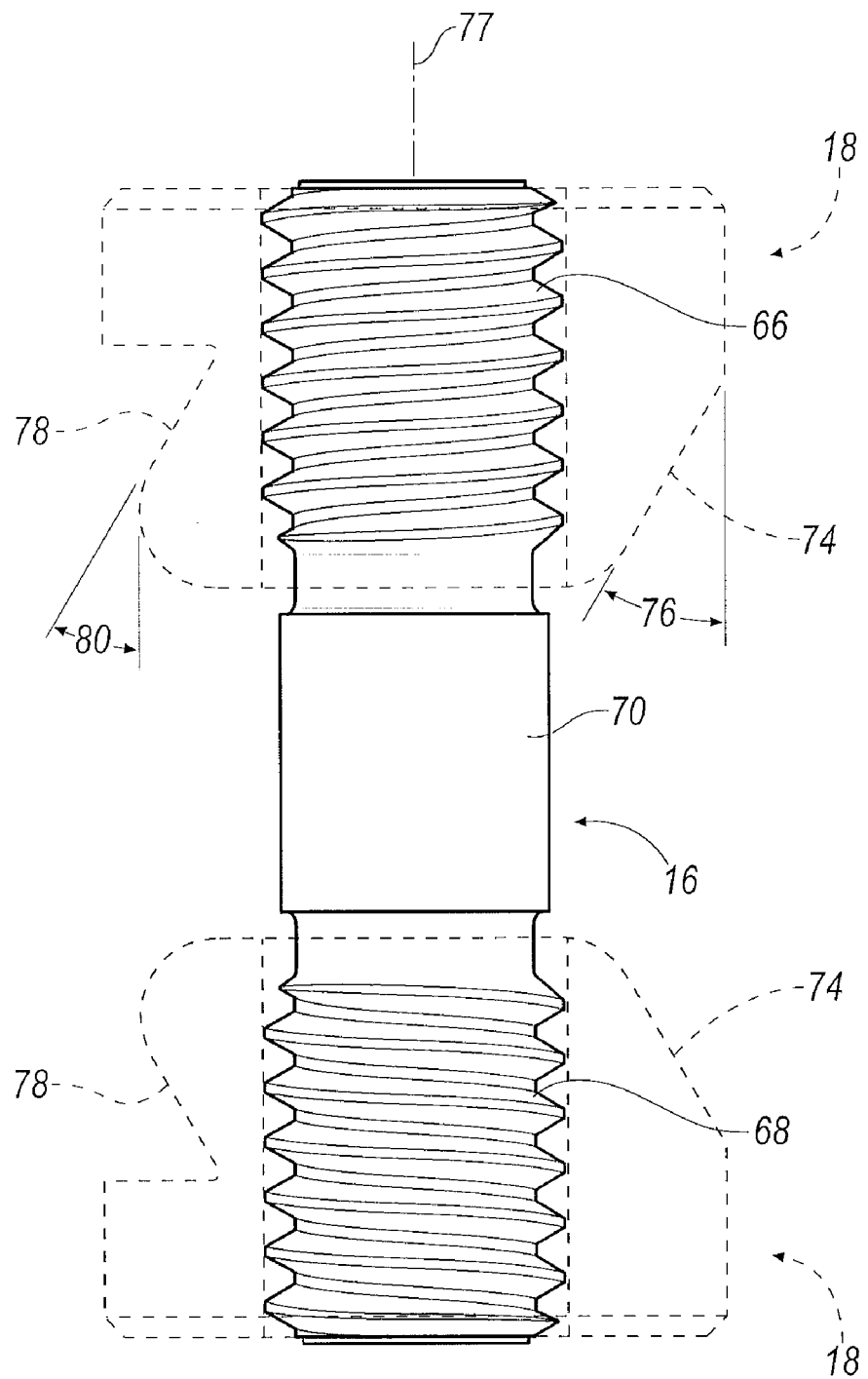
FIG. 7 is a side view of the double-ended drive screw and wedge members of FIG. 6.
Figure 12:
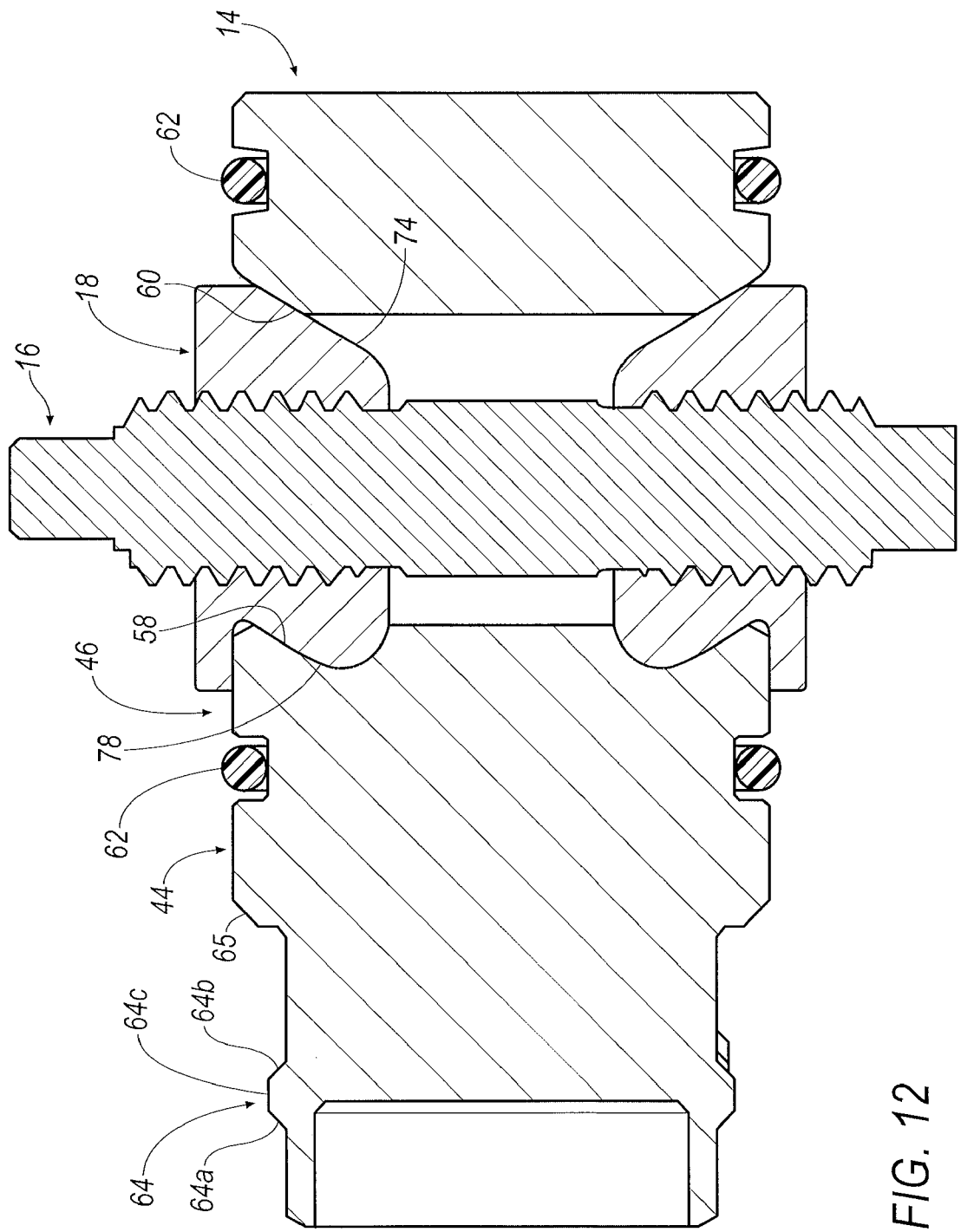
FIG. 12 is a cross-sectional view of the double-ended drive screw and wedge members of the side actuated collet lock mechanism according to an embodiment of the invention.

Referring now to FIGS. 6, 7 and 12, the double-ended drive screw 16 and the wedge members 18 are shown according to an embodiment of the invention. The drive screw 16 is generally cylindrical in shape and includes a first end portion 66, a second end portion 68 and a middle portion 70 between the first and second end portions 66, 68. The outer surface of the first end portion 66 is threaded, for example, with right hand threads, while the outer surface of the second end portion 68 is threaded, for example, with left hand threads. The first and second end portions 66, 68 are capable of being threaded onto the wedge members 18. One or both of the end portions 66, 68 includes a tool access 72 for allowing a tool to be inserted therein. In the illustrated embodiment, the tool access 72 is hexagonal in shape.

The wedge members 18 are generally cylindrical in shape and are substantially identical to each other. Each wedge member 18 includes a first cam surface 74 that forms an angle 76 with respect to a vertical axis 77 of the drive screw 16. The angle 76 can be in a range between about ten (10) degrees to about sixty (60) degrees, and preferably in a range between about twenty-five (25) degrees and about forty-five (45) degrees, and most preferably about thirty-five (35) degrees. Each wedge member 18 also includes a second cam surface 78 opposite the first cam surface 74 that forms an angle 80 with respect to the vertical axis 78 of the drive screw 16. The angle 76 can be in a range between about ten (10) degrees to about sixty (60) degrees, and preferably in a range between about twenty-five (25) degrees to about forty-five (45) degrees, and most preferably about thirty-five (35) degrees. Each wedge member 18 is complementary in cross-sectional shape to the aperture 52 of the drawbar 14 to be at least partially disposed therein. When the drive screw 16 and the wedge members 18 are at least partially disposed within the aperture 52 of the drawbar 14, the vertical axis 77 of the drive screw 16 is substantially perpendicular to the longitudinal axis 54 of the drawbar 14.

Figure 8:
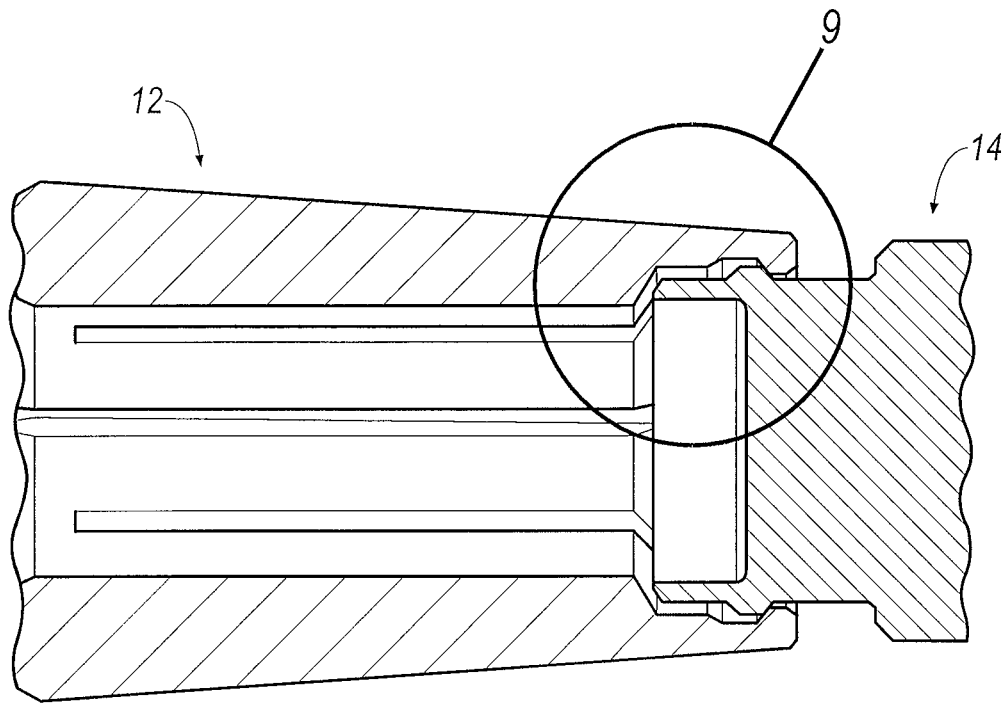
FIG. 8 is a cross-sectional view of the side actuated collet lock mechanism taken along line 8-8 of FIG. 2 when the mechanism is in a locked position.

In operation, the collet 12 is placed into position by being inserted into the collet bore 21 of the tool holder 25 such that the locking tabs 64 of the drawbar 14 are lined up between the slots 30 of the collet 12. The collet 12 is pushed into the collet bore 21 as far as possible and rotated, for example, in a counter clockwise direction until the sidewall 64f of the drawbar locking tabs 64 engage the end wall 43c of the collet locking tabs 43. The engagement of the sidewall 64f of the drawbar locking tabs 64 and the end wall 43c of the collet locking tabs 43 restrict any further rotation of the collet 12. At this point, sidewall 64e of the first portion 64a of the drawbar locking tabs 64 are disposed adjacent the sidewall 43b of the collet locking tabs 43. Then, the drive screw 16 is rotated, for example, in a clockwise direction, to cause the first cam surface 74 of the wedge members 18 to move downward and contact the side wall 60 of the drawbar 14. As a result, the drawbar 14 moves in a first direction along the longitudinal axis 54 of the drawbar 14 away from the shank 20 such that the sidewalls 64e of the drawbar locking tabs 64 contact the sidewalls 43b of the collet locking tabs 43, as shown in FIGS. 8 and 9. As the drive screw 16 continues to rotate, the drawbar 14 continues to move backward and pulls the collet 12 into the collet bore 21 of the tool holder 22. As the collet 12 is pulled into the collet bore 21, the taper of the collet bore 21 forces the collet 12 to compress radially inward and securely grip the tool shank 20. The deeper the collet 12 travels into the collet bore 21, the more force is exerted on the tool shank 20. The mechanism 10 is designed to exert a maximum amount of force when the front surface 36 of the collet 12 is substantially flush to a nose 27 of the tool holder 25, as shown in FIG. 1. At this point, the shank 20 is securely held in place by the collet 12.

Figure 10:
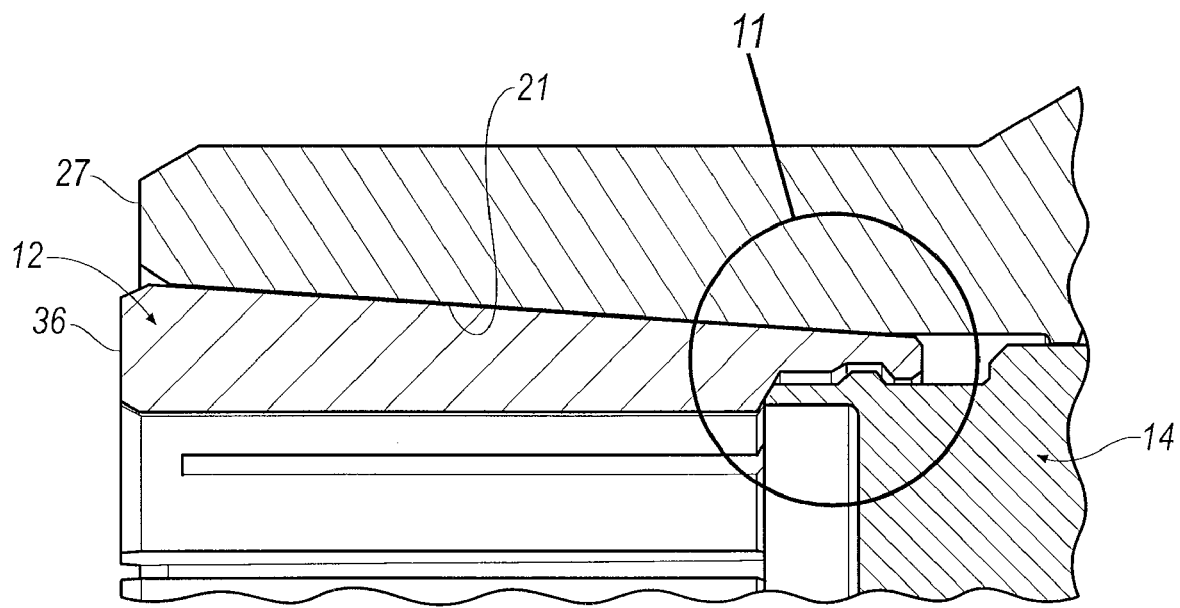
FIG. 10 is a cross-sectional view of the side actuated collet lock mechanism taken along line 8-8 of FIG. 2 when the mechanism is in an unlocked position.
Figure 11:
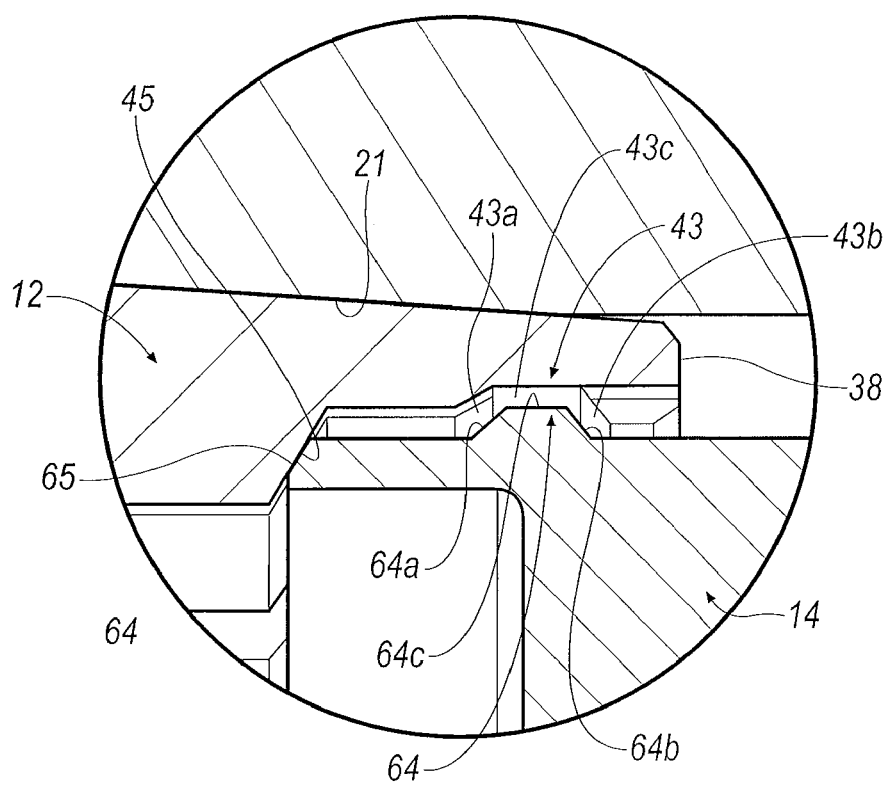
FIG. 11 is an enlarged view of the collet and drawbar shown in FIG. 10.

To release the shank 20 from the collet 12, the drive screw 16 is rotated in an opposite direction, for example, a counter-clockwise direction, to cause the second cam surface 78 of the wedge members 18 to move upward and contact the side wall 58 of the drawbar 14. As a result, the drawbar 14 moves in a second, opposite direction along the longitudinal axis 54 of the drawbar 14 toward the shank 20 such that the forward contact surface 65 of the drawbar 14 contacts the forward contact surface 45 of the collet 12, as shown in FIGS. 10 and 11. As the drive screw 16 continues to rotate, the drawbar 14 continues to move forward and pushes the collet 12 out from the collet bore 21 of the tool holder 25. As the collet 12 is pushed out of the collet bore 21, the taper of the collet bore 21 causes the collet 12 to expand radially outward and release the tool shank 20. At this point, the tool can be easily removed from the tool holder 25. Once the collet 12 is disengaged from the collet bore 21, the collet 12 can be turned clockwise until the first portion 64a of the drawbar locking tabs 64 are no longer adjacent the collet locking tabs 43. At this point, the collet 12 can be removed from the tool holder 25.

It will be appreciated that the principles of the invention can be practiced by using other means for connecting the collet to the drawbar. For example, in another embodiment, the collet is connected to the drawbar with a threaded portion. In this embodiment, the collet is manually engaged by rotation of the collet until the collet collapses on the shank eliminating any gap between the collet and the shank. Then, the drive screw is rotated to pull the drawbar and collet in the tool holder and firmly secure the shani. To remove the shank, the drive screw is rotated counterclockwise to push the drawbar and the collet out from the toolholder, thereby releasing the shank.

As described above, the side actuated collet lock mechanism of the invention uses generally cylindrical-shaped wedges to provide a flush face design that uses a high torque drive screw that is capable of being used in a quick change twist set draw system.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A side actuated collet lock mechanism, comprising:
a collet including a body having an inside surface;
a drawbar at least partially disposed within the collet, the drawbar including a recess formed with a bottom surface, a first side wall and a second side wall and a radially-extending aperture therethrough; and
a pair of wedge members threadingly received onto each end of a double-ended drive screw, the pair of wedge members and the double-ended drive screw at least partially disposed within the aperture of the drawbar, each wedge member including a first cam surface for selectively engaging the first side wall of the drawbar, and a second cam surface for selectively engaging the second side wall of the drawbar,
wherein rotation of the double-ended drive screw in a first direction causes the first cam surface to engage the first side wall of the drawbar and move the drawbar in a first direction along its longitudinal axis such that the drawbar engages the inside surface of the collet and pulls the collet in the first direction, thereby causing the collet to collapse radially inward, and
wherein rotation of the double-ended drive screw in a second direction causes the second cam surface to engage the second side wall of the drawbar and move the drawbar in a second direction along its longitudinal axis such that the drawbar pushes the collet in the second direction, thereby causing the collet to expand radially outward.

2. A mechanism according to claim 1, wherein the body of the collet includes a generally parallel array of slots separated by gripping fingers.

3. A mechanism according to claim 1, wherein a first portion of the drawbar includes a plurality of locking tabs that engage the inside surface of the collet when the drawbar moves along its longitudinal axis.

4. A mechanism according to claim 1, wherein the radially-extending aperture of the drawbar is substantially perpendicular to its longitudinal axis.

5. A mechanism according to claim 1, wherein the first cam surface forms an angle with respect to a vertical axis of the double-ended drive screw.

6. A mechanism according to claim 5, wherein the angle is between about ten degrees to about sixty degrees.

7. A mechanism according to claim 1, wherein the second cam surface forms an angle with respect to a vertical axis of the double-ended drive screw.

8. A mechanism according to claim 7, wherein the angle is between about ten degrees to about sixty degrees.

9. A mechanism according to claim 1, wherein the drawbar includes coolant passages.

10. A side actuated collet lock mechanism for securing a tool shank in a tool holder, comprising:
- a collet including a body with a passageway having an inside surface, the body of the collet including a generally parallel array of slots separated by gripping fingers;
- a drawbar including a body having a first portion including a plurality of locking tabs being at least partially disposed within the passageway of the collet, the body having second portion including a recess and a radially-extending aperture therethrough, the recess formed with a bottom surface, a first side wall and a second side wall; and
- a pair of wedge members threadingly received onto each end of a double-ended drive screw, the pair of wedge members and the double-ended drive screw at least partially disposed within the aperture of the drawbar, each wedge member including a first cam surface for selectively engaging the first side wall of the drawbar, and a second cam surface for selectively engaging the second side wall of the drawbar,
- wherein rotation of the double-ended drive screw in a first direction causes the first cam surface to engage the first side wall of the drawbar and move the drawbar in a first direction along its longitudinal axis such that the locking tabs of the drawbar engage the inside surface of the collet, and
- wherein rotation of the double-ended drive screw in a second direction causes the second cam surface to engage the second side wall of the drawbar and move the drawbar in a second direction along its longitudinal axis such that the locking tabs of the drawbar no longer engage the inside surface of the collet.

11. A mechanism according to claim 10, wherein the radially-extending aperture of the drawbar is substantially perpendicular to its longitudinal axis.

12. A mechanism according to claim 10, wherein the first cam surface forms an angle with respect to a vertical axis of the double-ended drive screw.

13. A mechanism according to claim 12, wherein the angle is between about ten degrees to about sixty degrees.

14. A mechanism according to claim 10, wherein the second cam surface forms an angle with respect to a vertical axis of the double-ended drive screw.

15. A mechanism according to claim 14, wherein the angle is between about ten degrees to about sixty degrees.

16. A mechanism according to claim 10, wherein the drawbar includes coolant passages.

17. A mechanism according to claim 10, wherein each locking tab of the drawbar is formed with a first angled contact wall, a second angled contact wall and a raised central portion.

18. A mechanism according to claim 17, wherein the collet further includes a plurality of retaining recesses formed with a first contact wall, a second contact wall and a raised central portion.

19. A mechanism according to claim 18, wherein the first angled contact wall of the drawbar engages the first contact wall of the collet when the double-ended screw is rotated in the first direction, and wherein the second angled contact wall of the drawbar engages the second contact wall of the collet when the double-ended screw is rotated in the second direction.

* * * * *

UNITED STATES PATENT AND TRADEMARK OFFICE
CERTIFICATE OF CORRECTION

| | | |
|---|---|---|
| PATENT NO. | : 8,257,003 B2 | Page 1 of 1 |
| APPLICATION NO. | : 12/235992 | |
| DATED | : September 4, 2012 | |
| INVENTOR(S) | : Michael R. McCormick et al. | |

It is certified that error appears in the above-identified patent and that said Letters Patent is hereby corrected as shown below:

In the Specification, In Column 6, Line 12, delete "shani." and insert -- shank. --, therefor.

Signed and Sealed this
Twenty-third Day of April, 2013

Teresa Stanek Rea
*Acting Director of the United States Patent and Trademark Office*